US00RE36299E

United States Patent [19]

Tanaka et al.

[11] E Patent Number: Re. 36,299

[45] Reissued Date of Patent: Sep. 14, 1999

[54] OPTICAL SYSTEM FOR MICROSCOPES

[75] Inventors: Takaaki Tanaka; Toshinobu Suzuki; Chikara Nagano, all of Hachioji, Japan

[73] Assignee: Olympus Optical Co., Ltd., Tokyo, Japan

[21] Appl. No.: 08/808,746

[22] Filed: Feb. 28, 1997

Related U.S. Patent Documents

Reissue of:

[64] Patent No.: 5,394,271
Issued: Feb. 28, 1995
Appl. No.: 07/964,910
Filed: Oct. 22, 1992

[30] Foreign Application Priority Data

Oct. 22, 1991 [JP] Japan ..... 3-274158

[51] Int. Cl.[6] ..... G02B 21/02

[52] U.S. Cl. ..... 359/656; 359/794

[58] Field of Search ..... 359/379, 380, 359/656

[56] References Cited

U.S. PATENT DOCUMENTS 3,421,807 1/1969 Nothnagle et al. ..... 359/380

5,121,255 6/1992 Hayashi ..... 359/656

FOREIGN PATENT DOCUMENTS 63-311222 12/1988 Japan .

*Primary Examiner*—Christopher Verdier

*Attorney, Agent, or Firm*—Pillsbury Madison & Sutro LLP

[57] ABSTRACT

An optical system for microscopes includes an objective lens for collimating beams of light emanating from an object and an imaging lens for forming parallel beams emerging from the objective lens into an image of the object at a predetermined position, and satisfies the equation:

$$0.5\ f<W<1.1\ f$$

where W is the variable amount of spacing from the contact surface of the objective lens to the surface of incidence of the imaging lens and f is the focal length of the imaging lens. Thus, the optical system for microscopes allows a large variable amount to be secured while holding a good imaging condition and is unsurpassed in extensity of the system to be able to accommodate various modes of observation.

7 Claims, 7 Drawing Sheets

OPTICAL SYSTEM FOR MICROSCOPES

Matter enclosed in heavy brackets [ ] appears in the original patent but forms no part of this reissue specification; matter printed in italics indicates the additions made by reissue.

BACKGROUND OF THE INVENTION a) Field of the Invention

This invention relates to an imaging optical system for microscopes.

b) Description of the Prior Art

An optical microscope most suitable for observation and photometry of a cell in vivo is often utilized for conducting researches and examinations in the field of industry, not to speak of the field of biology. Recently, in keeping with the improvement of performance of various sensors including an image sensor, such as a CCD, the usage of the microscope relying mainly on visibility has changed to that relying mainly on sensors. Contrary to such a change of usage, however, the optical system and fundamental arrangement of the microscope remain unchanged, so that when the sensors are employed, it is necessary to add various improvements to the microscope in accordance with the purpose of research and the object of observation. For example, where an intermediate image located between an objective lens and an imaging lens is directly introduced to the CCD, with a visual observation of an image, to process and record an observed image through the CCD, an appreciable improvement of its mechanism is required for an optical path from the objective lens to a lens-barrel for observation, according to which a complicated optical system is also required for the security of the amount of marginal light and the maintenance of magnification.

Specifically, the use of the optical system and fundamental arrangement of the conventional microscope leads to great restriction on insertion or removal of the intermediate lens-barrel and makes it impossible to insert or remove a unit, such as an image converter intermediate lens-barrel (image module) for using the image sensor, together with intermediate lens-barrels, such as an intermediate magnification lens-barrel and a reflecting projection tube. If, therefore, the optical system is such as to be free to insert or remove two to three intermediate lens-barrels, each having a length of nearly 50 mm, it will dispense with the need for the improvements, so that a single microscope can be used in accordance with various modes of observation.

The optical system of the conventional microscope may be divided, according to the difference in its imaging system, into two classes: a finite correction type for forming an image of an object at a finite distance through the objective lens itself and an infinite correction type for changing emergent light from the objective lens to nearly parallel beams. These types are now considered from the viewpoint on whether two to three intermediate lens-barrels can be inserted or removed as mentioned above. In the former, since an image relay lens must be incorporated in the principal path of the intermediate lens-barrel (the optical path of the lens-barrel on the observation side), the provision of the intermediate lens-barrels of two or more stages complicates the optical system and the resultant increase of the number of lenses reduces imaging performance on the observation side. Thus, the intermediate lens-barrel is limited to a single stage, and two to three lens-barrels cannot be inserted. In the latter, on the other hand, light beams between the objective lens and the imaging lens become parallel, so that if the intermediate lens-barrels are interposed therebetween, the image relay lens need not be incorporated and the imaging performance will be prevented from deteriorating due to the increase of the number of lenses. If, however, a one-stage intermediate lens barrel is assumed to have a length of 50 mm, the length of a two-stage intermediate lens-barrel will be 100 mm and consequently, a variable amount of at least 100 mm must be secured between the objective lens and the imaging lens. In this case, unless aberrations, such as coma and the like, are favorably corrected, the imaging performance will likewise deteriorate. Japanese Patent Preliminary Publication No. Sho 63-311222 sets forth an imaging lens in which the variable amount of spacing where the focal length of the imaging lens is represented by f is about 0.3 f. With this imaging lens, if the value of the focal length f is 160~200 mm, the variable amount of spacing within the range of 48~60 mm will merely be secured, a distance insufficient for insertion or removal of two to three intermediate lens-barrels.

SUMMARY OF THE INVENTION

It is, therefore, an object of the present invention to provide an optical system for microscopes having an infinite correction type in its imaging system which is free to insert or remove two to three intermediate lens-barrels and can accommodate various modes of observation.

This object is accomplished, according to the present invention, by providing an objective lens for changing light from an object to parallel beams and an imaging lens for forming the parallel beams emerging from the objective lens into an image of the object at a predetermined position, in which a distance is variable from a contact surface of the objective lens to a surface on the incidence side of the imaging lens, and Eq. (1) which will be stated later is satisfied.

According to another aspect of the present invention, the optical system for microscopes is constructed so that the imaging lens includes a first lens component having a positive power and a second lens component composed of a negative cemented doublet configured from a positive lens and a negative lens and Eqs. (2) to (4) which will be stated later are satisfied.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
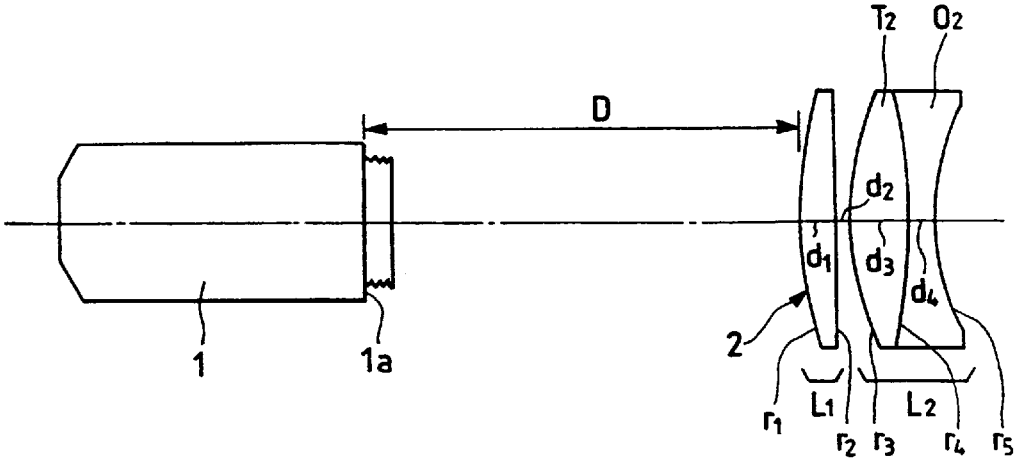
FIG. 1 is a sectional view showing the configuration of a first embodiment of an optical system for microscopes according to the present invention.

Prior to describing the embodiments, the fundamental conditions and functions of the present invention will be explained below.

The microscope optical system according to the present invention is of an infinite correction type and designed so that the distance from an objective lens to an imaging lens is variable only within the range defined by the following equation, thereby providing the variable amount of spacing enough to insert or remove two to three intermediate lens-barrels:

$$0.5f<W<1.1f \quad (1)$$

where W is the variable amount of spacing from the contact surface of the objective lens to the first surface of the imaging lens and f is the focal length of the imaging lens.

Hence, if the focal length f is to be 160 mm, the variable amount of spacing W becomes 80~176 mm, and the focal length f of 180 mm brings about the variable amount of spacing of 90~198 mm, which are sufficient to insert or remove the intermediate lens-barrels, such as an intermediate magnification lens-barrel and a reflecting projection tube, of two to three stages at the same time.

In order to minimize the shortage of the amount of marginal light and the changes of aberrations including coma in particular when such a widely variable amount of spacing is secured, it is desirable that the imaging lens is constructed as follows: The imaging lens comprises a first lens component $L_1$ having a positive power and a second lens component $L_2$ configured by cementing a positive lens $T_2$ to a negative lens $O_2$, having a negative power, and satisfies the conditions defined by the equations:

$$0.75f<f_1<0.9f \quad (2)$$

$$0.77<|fO_2/fT_2|<1.0 \quad (3)$$

$$0.14f<ED_1<0.19F \quad (4)$$

where f is the focal length of the imaging lens, $f_1$ is the focal length of the first lens component $L_1$, $fT_2$ is the focal length of the positive lens $T_2$, $fO_2$ is the focal length of the negative lens $O_2$, and $ED_1$ is the effective diameter of the first lens component $L_1$.

Next, reference is made to the functions of the optical system based on the above equations.

Eq. (1) is the condition for inserting or removing two to three intermediate lens-barrels in the microscope optical system according to the present invention. The intermediate lens-barrels currently known are available in intermediate magnification and discussion lens-barrels, and if the reflecting projection tube is also regarded as one of the intermediate lens-barrels, the lengths of individual barrels will be nearly 40~70 mm and as such the intermediate lens-barrels of two to three stages will have the overall lengths of 80~210 mm. From the fact that in general the distance of parfocality of the objective lens is 45 mm and the condition of the back focus for configuring a binocular tube prism, the focal length of the imaging lens is within the range of nearly 160~200 mm. Hence, it follows from this that if the variable amount of spacing W exceeds the lower limit of Eq. (1), two to three intermediate lens-barrels cannot be inserted or removed. On the other hand, the excess of the upper limit increases the outer diameter of the imaging lens in order to secure the amount of marginal light and at the same time, produces the necessity of increasing also the size of the binocular tube prism in the lens-barrel for observation, with resultant oversizing of the observation lens-barrel, which situation is unfavorable.

Eq. (2) is the condition for correcting optimally the change of coma aberration where the distance between the objective lens an the imaging lens is variable, namely, where the position of the entrance pupil of the imaging lens is variable. If the focal length $f_1$ of the first lens component $L_1$ exceeds the lower limit of Eq. (2), the imaging lens will be undercorrected for coma on the side of the upper ray, whereas if it exceeds the upper limit, the lens will be overcorrected for the coma, and the result is that asymmetric coma is liable to occur. This is because, when the distance between the objective lens and the imaging lens is particularly large, that is, in a state where the value of the variable amount of spacing W is close to the upper limit of Eq. (1), the upper ray is incident at the highest position from the optical axis of the first surface of the imaging lens, so that it is greatly affected by the positive power of the first lens component $L_1$.

Eq. (3), similar to Eq. (2), is the condition for making the position of the exit pupil approach toward the image while correcting for coma. If the magnitude of the ratio of the focal length $fO_2$ of the negative lens $O_2$ of the second lens component $L_2$ to the focal length $fT_2$ of the positive lens $T_2$ exceeds the lower limit of Eq. (3), the power of the negative lens $O_2$ will increase. This is advantageous to the approach of the position of the exit pupil toward the image, but brings about an overcorrection for coma on the side of the upper ray. If, conversely, it exceeds the upper limit, the negative power becomes too small with the inconvenience that the position of the exit pupil is shifted toward the objective lens.

Eq. (4) is the condition for securing the amount of marginal light If the effective diameter $ED_1$ of the first lens component $L_2$ exceeds the lower limit of Eq. (4), the amount of marginal light becomes difficult to be sufficiently secured, while the excess of the upper limit makes the effective diameter large unnecessarily, resulting in a remarkable increase of flare.

By fulfilling the conditions mentioned above, the optical system with the variable amount of wide spacing can be constructed and a good imaging condition can be created over a wide range from a state where the intermediate lens-barrels are not inserted to another state where two to three intermediate lens-barrels are inserted. Further, the variation of the position of the exit pupil is held to a minimum and can be corrected by the optical system like the eyepiece subsequent to the imaging lens.

Referring to the drawings, the embodiments of the present invention will be explained below.

First embodiment

The microscope optical system of a first embodiment, as shown in FIG. 1, comprises an objective lens 1 and an imaging lens 2 including two lens components of a first lens component $L_1$ having a positive power and a second lens component $L_2$ having a negative power. The second lens component $L_2$ is a cemented doublet configured by a positive lens $T_2$ and a negative lens $O_2$. Calling f the focal length of the imaging lens 2, a distance D from a contact surface 1a of the objective lens 1 to a first surface of the imaging lens 2 is such as to be variable within the range of 0.25 f~0.85 f. Thus, the variable amount of spacing W of this embodiment is 0.6 f.

Figure 2:
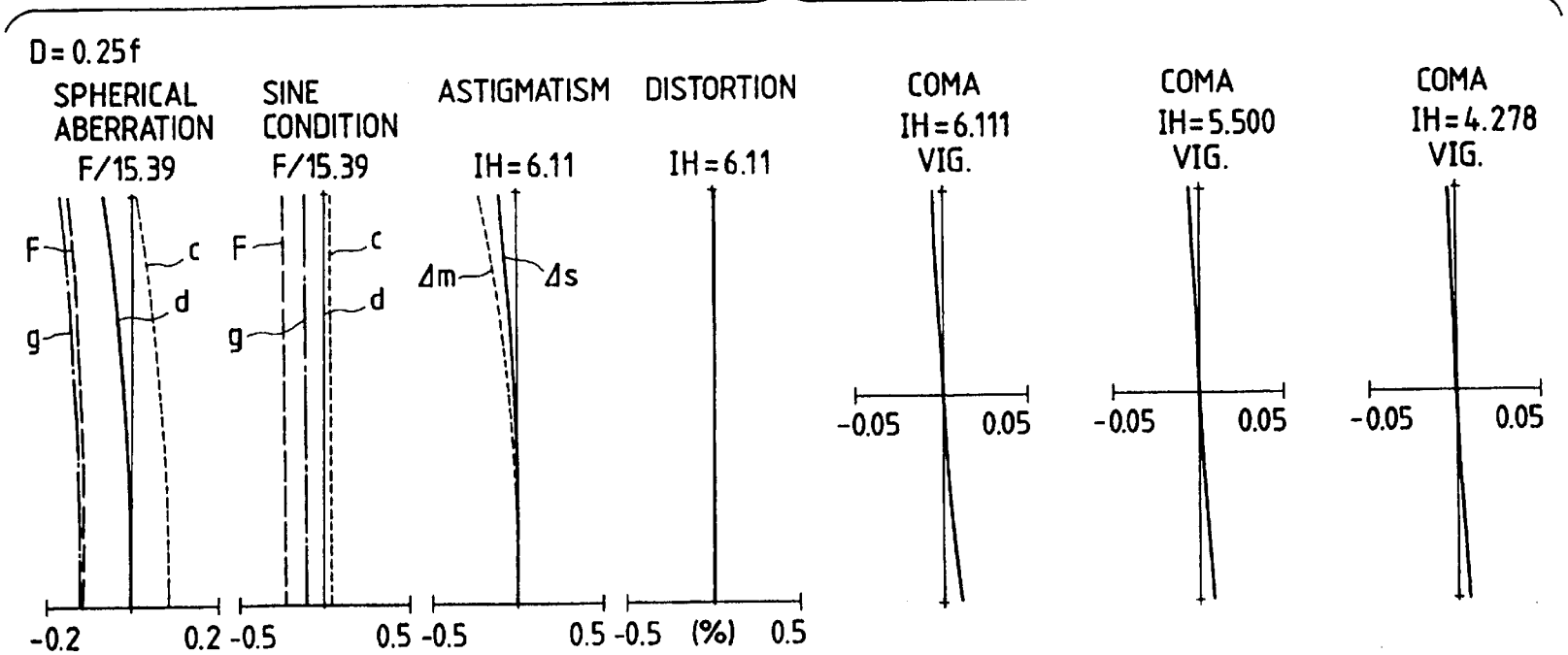
FIG. 2 is a diagram for aberrations when a distance D=0.25 f in the first embodiment.
Figure 3:
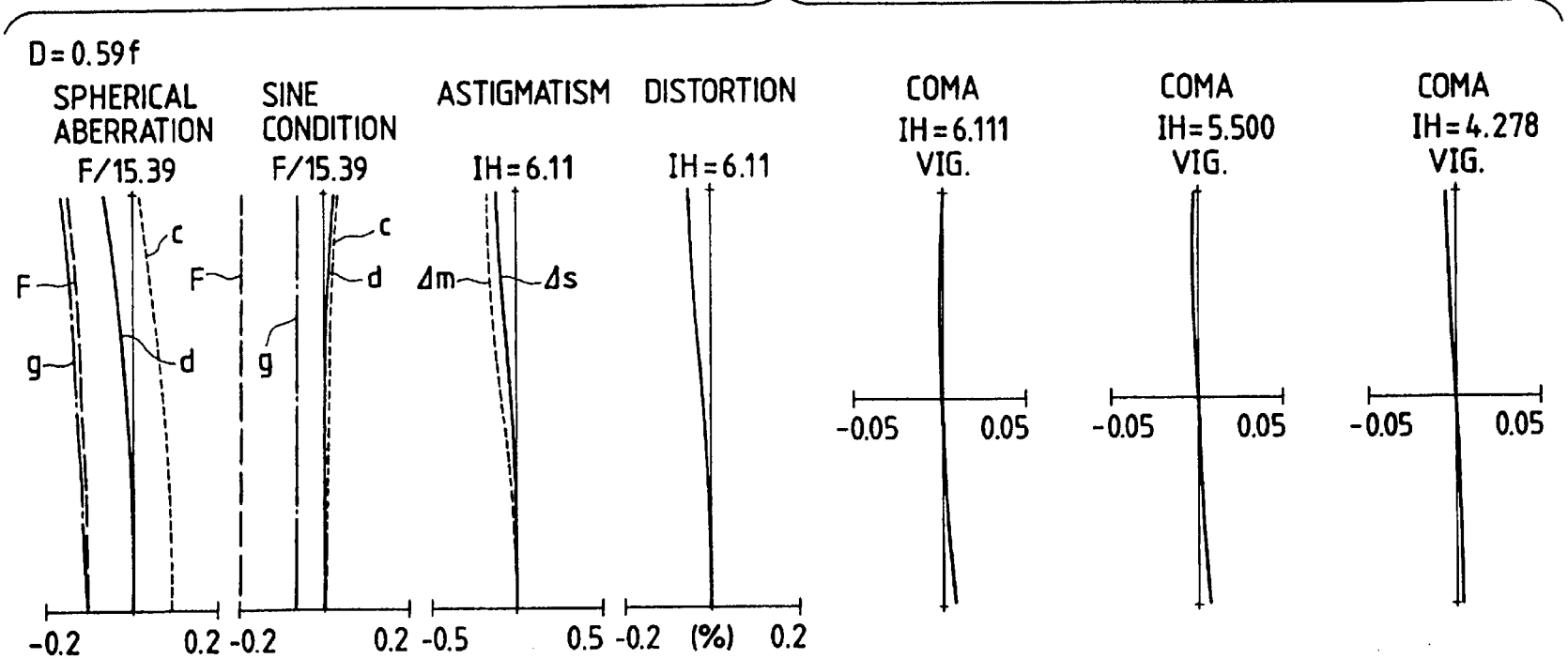
FIG. 3 is a diagram for aberrations when a distance D=0.59 f in the first embodiment.
Figure 4:
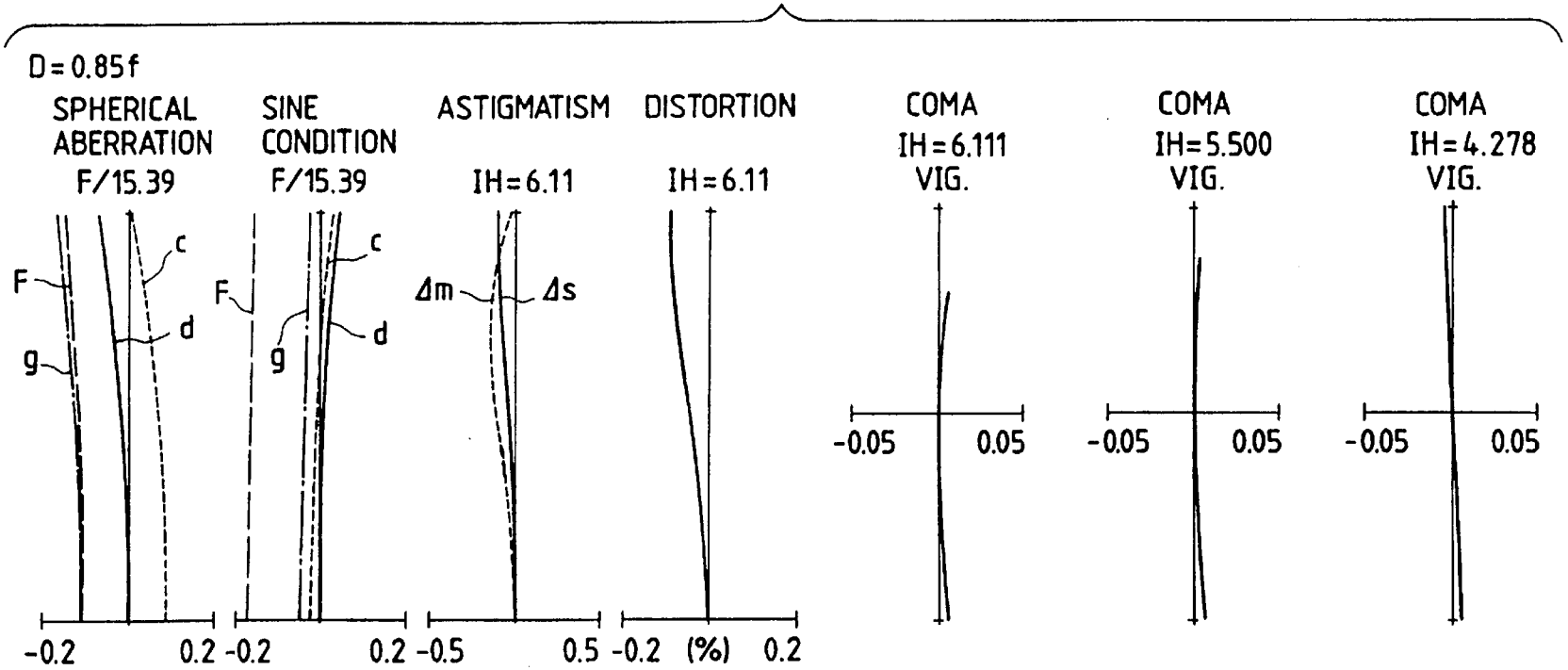
FIG. 4 is a diagram for aberrations when a distance D=0.85 f in the first embodiment.

In such an optical system, FIG. 2 depicts aberrations for the imaging lens when the distance D=0.25 f, FIG. 3 illustrates aberrations when D=0.59 f, and FIG. 4 shows aberrations when D=0.85 f. The numerical data of the imaging lens 2 in the first embodiment are listed below, where reference symbols $r_1$, $r_2$, . . . represent radii of curvature of individual lenses arranged in order from the objective side; $d_1$, $d_2$, . . . spaces between individual lens surfaces; $n_1$, $n_2$, . . . refractive indices of individual lenses; and $\nu_1$, $\nu_2$, . . . Abbe's numbers of individual lenses in terms of the D line.

| f = 100, $f_1$ = 0.776 f, $\lvert fO_2/fT_2\rvert$ = 0.816, $ED_1$ = 0.15 f | | | |
|---|---|---|---|
| $r_1$ = 30.5194 | | | |
| | $d_1$ = 1.6667 | $n_1$ = 1.48749 | $\upsilon_1$ = 70.2 |
| $r_2$ = 154.9333 | | | |
| | $d_2$ = 0.1866 | | |
| $r_3$ = 18.2894 | | | |
| | $d_3$ = 3.3333 | $n_2$ = 1.72342 | $\upsilon_2$ = 37.95 |
| $r_4$ = −50.5194 | | | |
| | $d_4$ = 1.4444 | $n_3$ = 1.71850 | $\upsilon_3$ = 33.52 |
| $r_5$ = 14.4040 | | | |

Second embodiment

Figure 5:
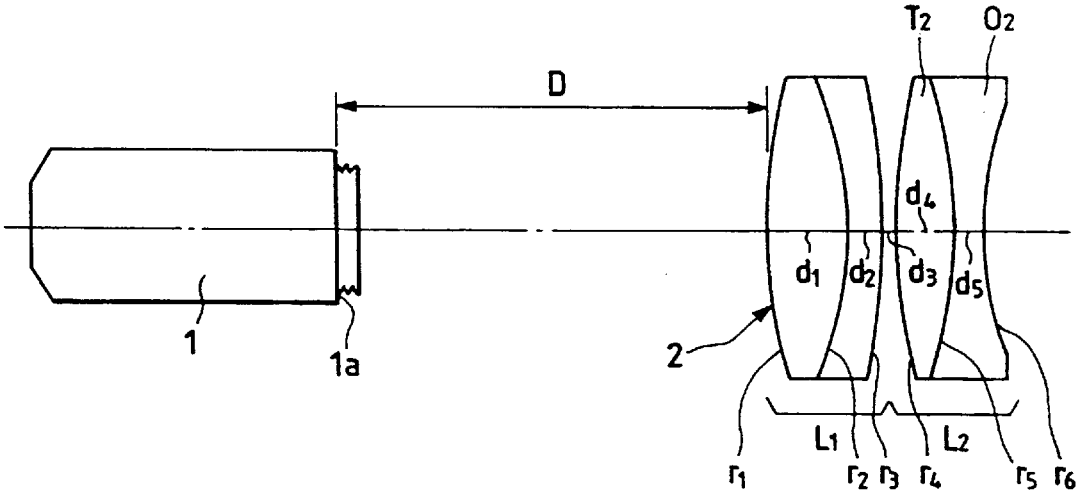
FIG. 5 is a sectional view showing the configuration of a second embodiment of an optical system for microscopes according to the present invention.

The microscope optical system of a second embodiment, as shown in FIG. 5, comprises the objective lens 1 and the imaging lens 2 including two lens components of the first lens component $L_1$ having a positive power and the second lens component $L_2$ having a negative power. Each of the first lens component $L_1$ and the second lens component $L_2$ is a cemented doublet configured by cementing a positive lens to a negative lens. A distance D from the contact surface 1a of the objective lens 1 to the first surface of the imaging lens 2, similar to the first embodiment, is such as to be variable within the range of 0.25 f~0.85 f. Thus, the variable amount of spacing W of this embodiment also is 0.6 f.

Figure 6:
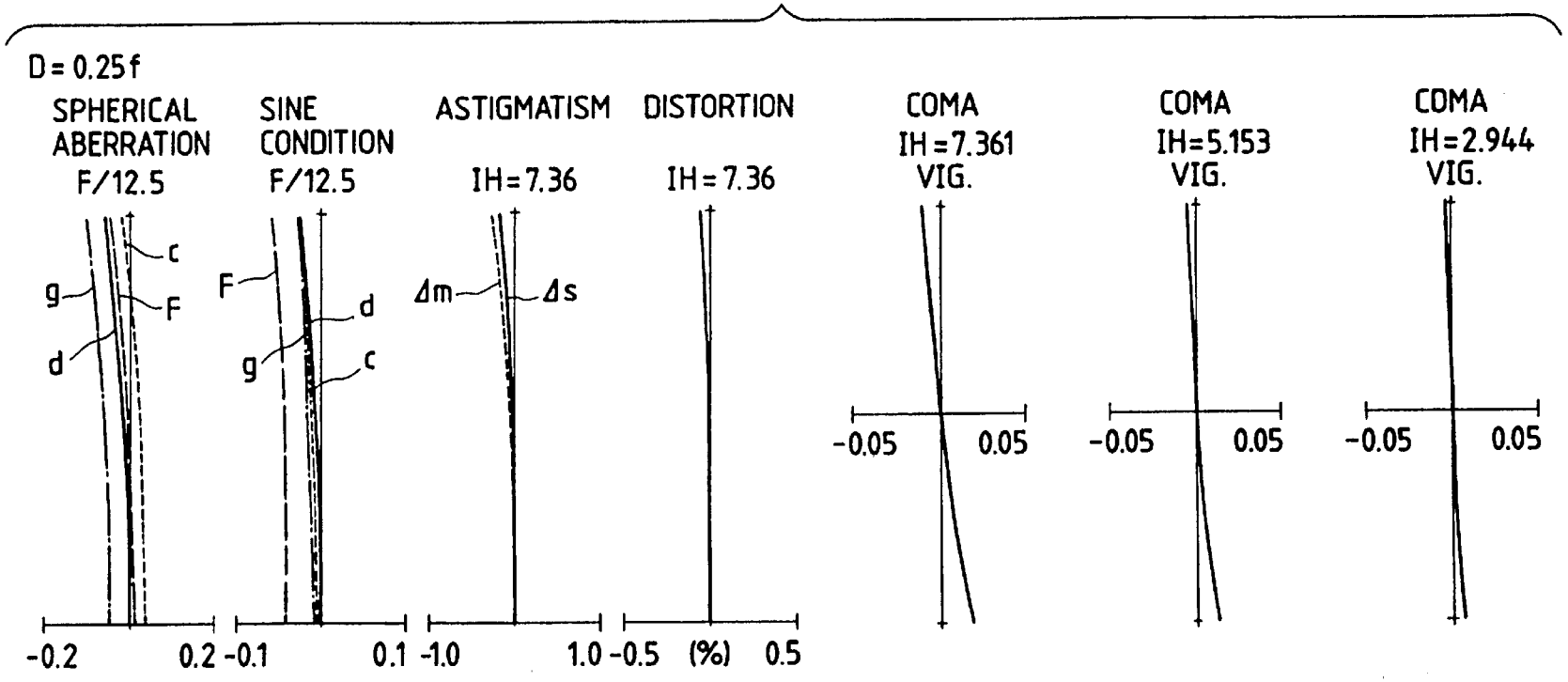
FIG. 6 is a diagram for aberrations when a distance D=0.25 f in the second embodiment.
Figure 7:
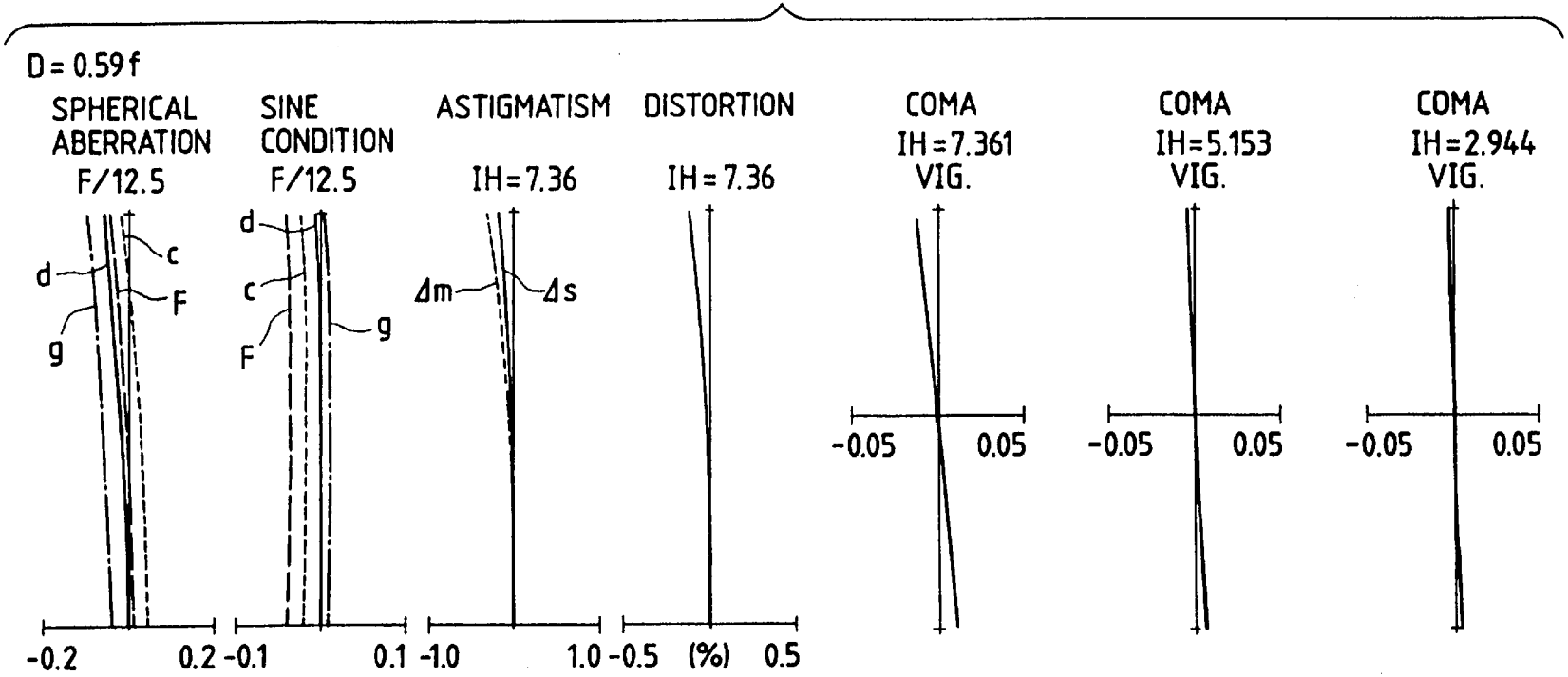
FIG. 7 is a diagram for aberrations when a distance D=0.59 f in the second embodiment.
Figure 8:
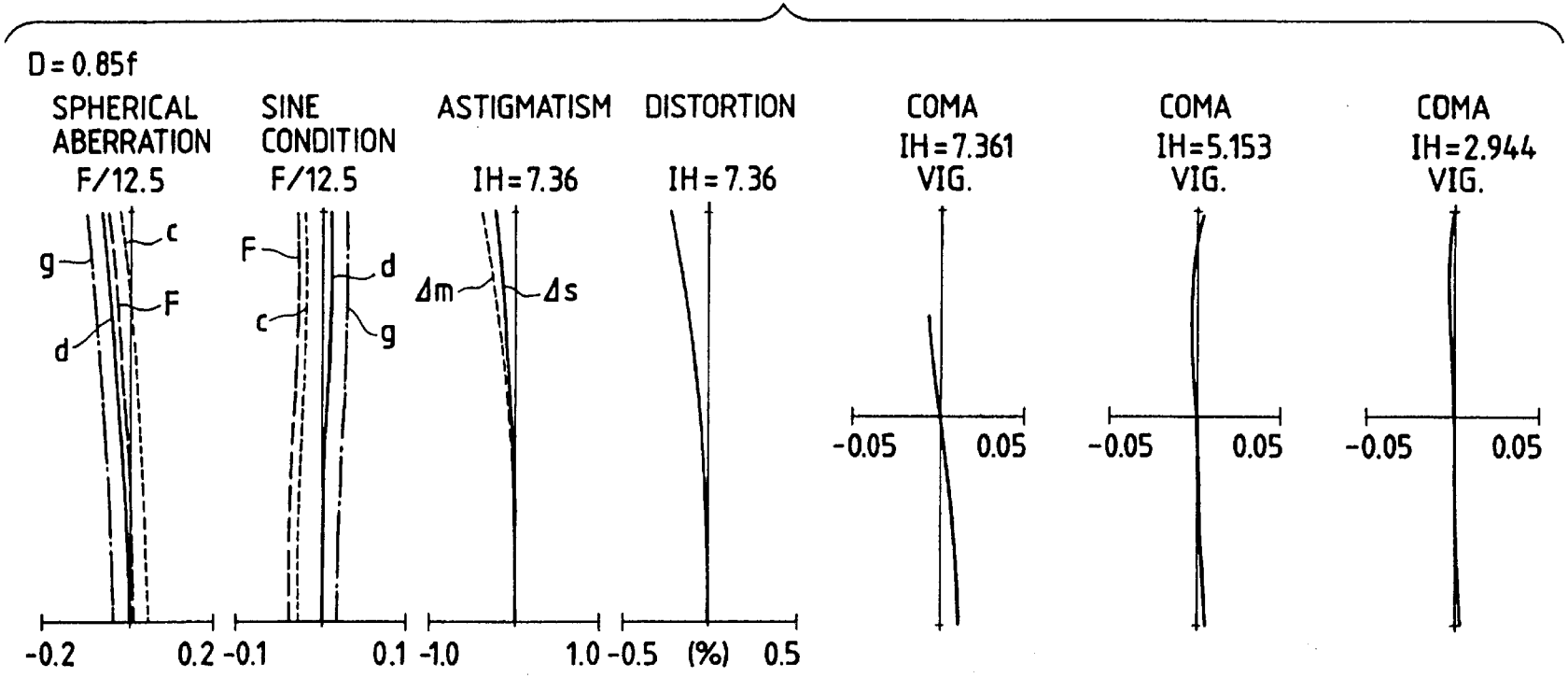
FIG. 8 is a diagram for aberrations when a distance D=0.85 f in the second embodiment.

In such an optical system, FIG. 6 depicts aberrations for the imaging lens when the distance D=0.25 f, FIG. 7 aberrations when D=0.59 f, and FIG. 8 aberrations when D=0.85 f. The numerical data of the imaging lens 2 in the second embodiment are listed below.

| f = 100, $f_1$ = 0.856 f, $\lvert fO_2/fT_2\rvert$ = 0.892, $ED_1$ = 0.17 f | | | |
|---|---|---|---|
| $r_1$ = 38.1217 | | | |
| | $d_1$ = 4.5889 | $n_1$ = 1.48749 | $\upsilon_1$ = 70.2 |
| $r_2$ = −36.8464 | | | |
| | $d_2$ = 1.9111 | $n_2$ = 1.80610 | $\upsilon_2$ = 40.95 |
| $r_3$ = −56.9778 | | | |
| | $d_3$ = 0.4083 | | |
| $r_4$ = 46.8789 | | | |
| | $d_4$ = 3.0889 | $n_3$ = 1.83400 | $\upsilon_3$ = 37.16 |
| $r_5$ = −28.1233 | | | |
| | $d_5$ = 1.8333 | $n_4$ = 1.64450 | $\upsilon_4$ = 40.82 |
| $r_6$ = 22.5833 | | | |

What is claimed is:

1. An optical system for microscopes comprising:

an objective lens for converting light from an object into substantially parallel beams; and an imaging lens for focusing the beams from said objective lens to form a magnified image of the object at a predetermined position, wherein a distance from a contact surface of said objective lens to a surface closest to said objective lens, of said imaging lens, is variable and said optical system satisfies the condition:

$$0.5f<W<1.1f$$

where W is the amount of change of the distance from the contact surface of the objective lens to the surface closest to the objective lens, of the imaging lens, and f is the focal length of the imaging lens;

wherein said optical system for microscopes is adapted to allow insertion and removal of lens elements between said lenses.

2. An optical system for microscopes comprising:

an objective lens for converting light from an object into substantially parallel beams; and an imaging lens equipped with a first lens component having a positive refractive power and a second lens component including a negative cemented doublet configured by cementing a positive lens to a negative lens, said imaging lens for focusing the beams from said objective lens to form a magnified image of the object at a predetermined position, wherein a distance from a contact surface of said objective lens to a surface closest to said objective lens, of said imaging lens, is variable and said optical system satisfies conditions:

$$0.5f\leqq W<1.1f$$

$$0.75f<f_1<0.9f$$

$$0.77<\lvert fO_2/fT_2\rvert<1.0$$

$$0.14f<ED_1<0.19f$$

where W is the amount of change of the distance from the contact surface of the objective lens to the surface closest to the objective lens, of the imaging lens, f is the focal length of the imaging lens, $f_1$ is the focal length of the first lens component, $fT_2$ is the focal length of the positive lens of the second lens component, $fO_2$ is the focal length of the negative lens of the second lens component, and $ED_1$ is the effective diameter of the first lens component.

*3. An optical system for microscopes comprising:*

*an objective lens for converting light from an object into substantially parallel beams; and*

*an imaging lens for focusing the beams from said objective lens to form a magnified image of the object at a predetermined position, wherein a distance from a contact surface of said objective lens to a surface closest to said objective lens, of said imaging lens, is variable and said optical system satisfies the condition:*

$$0.5\ f<W<1.1\ f$$

*where W is the amount of change of the distance form the contact surface to the objective lens to the surface closest to the objective lens, of the imaging lens, and f is the focal length of the imaging lens; wherein said optical system for microscopes is adapted to allow insertion and removal of intermediate lens barrels between said lenses.*

*4. An optical system for microscopes according to claim 3, wherein said optical system for microscopes is adapted toallow insertion and removal of two to three intermediate lens barrels at the same time between said lenses.*

*5. An optical system for microscopes according to claim 3 or 4, wherein said intermediate lens barrels comprise an intermediate magnification lens barrel.*

*6. An optical system for microscopes according to claim 3 or 4, wherein said intermediate lens barrels comprise a reflecting projection tube.*

*7. An optical system for microscopes according to claim 3 or 4, wherein said intermediate lens barrels comprise a discussion lens barrel.*

* * * * *